(12) United States Patent
Myrah et al.

(10) Patent No.: US 8,959,191 B2
(45) Date of Patent: Feb. 17, 2015

(54) SCRIPT MODIFICATION SUGGESTION

(75) Inventors: Michael G Myrah, Cypress, TX (US);
Brian M Spencer, Spring, TX (US);
Zachary Jonathan Edens, Tomball, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 330 days.

(21) Appl. No.: 13/441,349

(22) Filed: Apr. 6, 2012

(65) Prior Publication Data
US 2013/0268639 A1    Oct. 10, 2013

(51) Int. Cl.
*G06F 15/177*    (2006.01)
(52) U.S. Cl.
USPC .............................................. 709/221
(58) Field of Classification Search
USPC ............... 709/220–222; 717/115–122
See application file for complete search history.

(56) References Cited

U.S. PATENT DOCUMENTS

| | | | |
|---|---|---|---|
| 5,881,236 A * | 3/1999 | Dickey | 709/221 |
| 6,868,292 B2 * | 3/2005 | Ficco et al. | 700/19 |
| 6,944,756 B2 | 9/2005 | Thomas, III | |
| 7,377,800 B2 | 5/2008 | Gasser | |
| 7,418,486 B2 * | 8/2008 | Brubacher et al. | 709/220 |
| 7,876,713 B2 | 1/2011 | Doherty et al. | |
| 2004/0090458 A1 * | 5/2004 | Yu et al. | 345/760 |
| 2004/0249907 A1 * | 12/2004 | Brubacher et al. | 709/220 |
| 2008/0155073 A1 * | 6/2008 | Swain | 709/222 |
| 2012/0011284 A1 | 1/2012 | Filali-Adib et al. | |
| 2012/0054820 A1 * | 3/2012 | Deter et al. | 726/1 |
| 2012/0239791 A1 * | 9/2012 | Takamoto | 709/222 |

* cited by examiner

*Primary Examiner* — Brendan Higa
(74) *Attorney, Agent, or Firm* — Hewlett-Packard Patent Department

(57) ABSTRACT

A resource of a system is discovered, where a component of the system is to provide the resource. A script is generated for the component providing the resource based on a rule. A suggestion to modify the script is provided based on at least one of a change in the rule, the resource, and the script by a user.

15 Claims, 4 Drawing Sheets

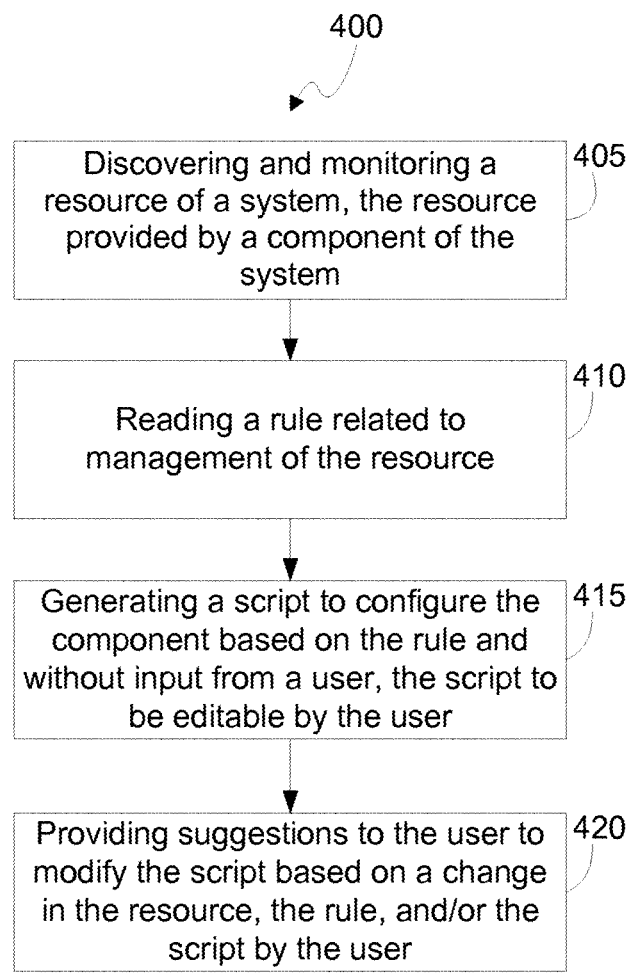

SCRIPT MODIFICATION SUGGESTION

BACKGROUND

Client systems, such as storage solutions, may include a plurality of devices, such as servers or server blades. A script is generally written for each of the devices to configure the respective device. For example, the script may be written for a new device added to system or the script may be modified for an existing device of the system, such as if the storage solution is reconfigured.

BRIEF DESCRIPTION OF THE DRAWINGS

The following detailed description references the drawings, wherein:

FIG. 4 is an example flowchart of a method for suggesting script modification.

DETAILED DESCRIPTION

Client systems, such as storage solutions, may include a plurality of devices, such as servers or server blades. A script is generally written for each of the devices to configure the respective device. For example, the script may be written for a new device added to system or the script may be modified for an existing device of the system, such as if the storage solution is reconfigured.

Different types of devices may use different scripting languages. Learning each of the devices' scripting languages to write the script may be tedious and error prone. For example, a help system of the device accessed through a command line interface (CLI) or a physical manual of the device may need to be used to learn a scripting syntax of the device. While some types of devices may be able to generate a script based on a current configuration of the device, determining which changes to make to the device when the system is reconfigured and editing the script to enact these changes may still be time consuming. For example, if one of the devices becomes dissociated from a consumer of resources of the device, an administrator must discover that the device is free to be allocated to another consumer of resources. Until the administrator discovers that the resource is unallocated, the device thereof will be underutilized. Further, an administrator must still determine how to allocate or assign the resource of the disassociated device. Depending on a size of the system, a number of the resources and consumers of the resources, types of optimization sought for the system, etc., the administrator may waste a lot of time before allocating the resource as well as allocate the resource in an inefficient manner.

Embodiments may automatically generate configuration scripts and provide suggestions for editing the configuration scripts. For example, embodiments may discover a resource in the system. A component of the system may provide the resource. Embodiments may automatically generate a script for the component to provide the resource based on a rule related to resource allocation. In addition, embodiments may provide a suggestion to modify the script in real time based on at least one of a change in the rule, the resource, and the script by a user. Thus, the user may not have to manually and separately create the configuration scripts of each of the devices. Further, the user may edit the script more quickly and in a more efficient manner based on the provided suggestion. For instance, the user may be able to generate or edit the script without having to access external resources, such as script syntax manuals or system applications that indicate resource statuses of the components.

Figure 1:
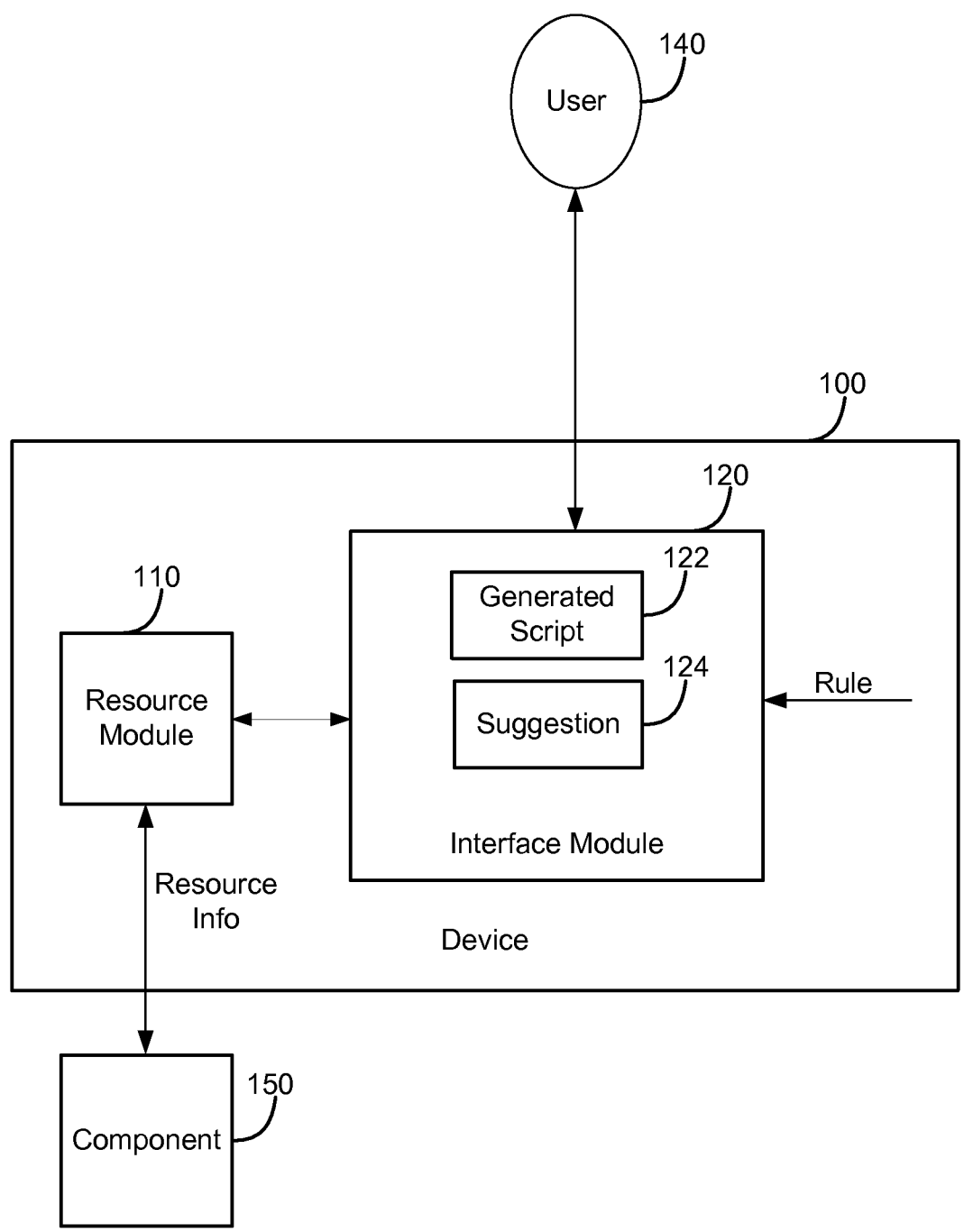
FIG. 1 is an example block diagram of a device for suggesting script modification.

Referring now to the drawings, FIG. 1 is an example block diagram of a device 100 for suggesting script modification. The device 100 may be included in any type of device to configure and/or control access to a resource of a component 150, such as a secure microprocessor, a notebook computer, a desktop computer, an all-in-one system, a slate computing device, a portable reading device, a wireless email device, a mobile phone, and the like. In the embodiment of FIG. 1, the device 100 includes a resource module 110 and an interface module 120.

The resource and interface modules 110 and 120 may include, for example, a hardware device including electronic circuitry for implementing the functionality described below, such as control logic and/or memory. In addition or as an alternative, the resource and interface modules 110 and 120 may be implemented as a series of instructions encoded on a machine-readable storage medium and executable by a processor.

The resource module 110 is to discover a resource in a system (not shown), where the component 150 of the system is to provide the resource. The system may include one or more of the components 150 interconnected by communication channels that allow sharing of resources and/or information, such as a network. Examples of the component 150 may include a storage device, a switch, enclosure, server, controller and/or any type of device capable of providing a resource to the system. Thus, example of the resources may include information storage, processing power, bandwidth, etc.

For example, upon discovering the component 150, the resource module 110 may receive information about the component 150, such as its type, identifier, model name and number, serial number, manufacturer name, and/or a description about how to configure the component 150. The description may include, for example, scripting syntax, commands, parameters, actions, arguments, data type or range, event characteristics, etc. for generating a script to configure the component 150. In one embodiment, the description about how to configure the component 150 may, for example, be retrieved from a graphical user interface (GUI) or help interface of the component 150. Further, the component 150 may instead or additionally provide a pointer, like a URL to a vendor-specific web site, to any of the above information. The resource module 110 may use a variety of protocols to carry out any of the above actions, such as Dynamic Host Configuration Protocol (DHCP), Simple Service Discovery Protocol (SSDP), Universal Plug and Play (UPnP) and the like. The resource module 110 will be explained in further detail below with respect to FIG. 2.

The interface module 120 is to generate a script 122 for configuring the component 150 providing the resource based on a rule. The rule may relate to at least one of distributing one or more of the resources evenly between one or more consumers of resources, maximizing a use of the one or more resources, allocating any of the more resources that are not being used, and allocating the one or more resources based on a type of optimization scheme.

The script 122 may include a program that automates the execution of tasks of the component 150, such as resource allocation of the component 150. Different types of components 150 may use different scripting languages. Scripting languages may range from domain-specific languages (DSL)

to general-purpose programming languages. Example of general-purpose programming languages include C, Java, Python and the like, while examples of DSL include HTML, Verilog, VHDL, Mata, Mathematica, Maxima, macros, SQL, YACC, and the like. Examples of simples DSLs further include shell scripts for a shell of a command line interpreter (CLI) of an operating system (OS), such as Unix shells, Windows PowerShell, MS-DOS COMMAND.COM, AppleScript, graphical Windows Script Host (WScript.exe), DCL, JCL and the like. Scripting languages may also include client-side scripting, which generally includes a class of computer programs on the web that are executed client-side by the user's web browser, such as JavaScript, VBScript, XUL, XSLT, and the like. In addition, scripting language may include text processing languages that use text files, such as configuration and log files.

The interface module 120 is to present the generated script 122 to the user as an initial allocation of the resource of the component 150, and the generated script 122 is editable by the user 140. Further, the interface module 120 is to provide a suggestion 124 to modify the script 122 in real time based on at least one of a change in the rule, in the resource by resource module 110, and the script 122 by a user 140. The interface module 120 will be explained in further detail below with respect to FIG. 2.

Figure 2:
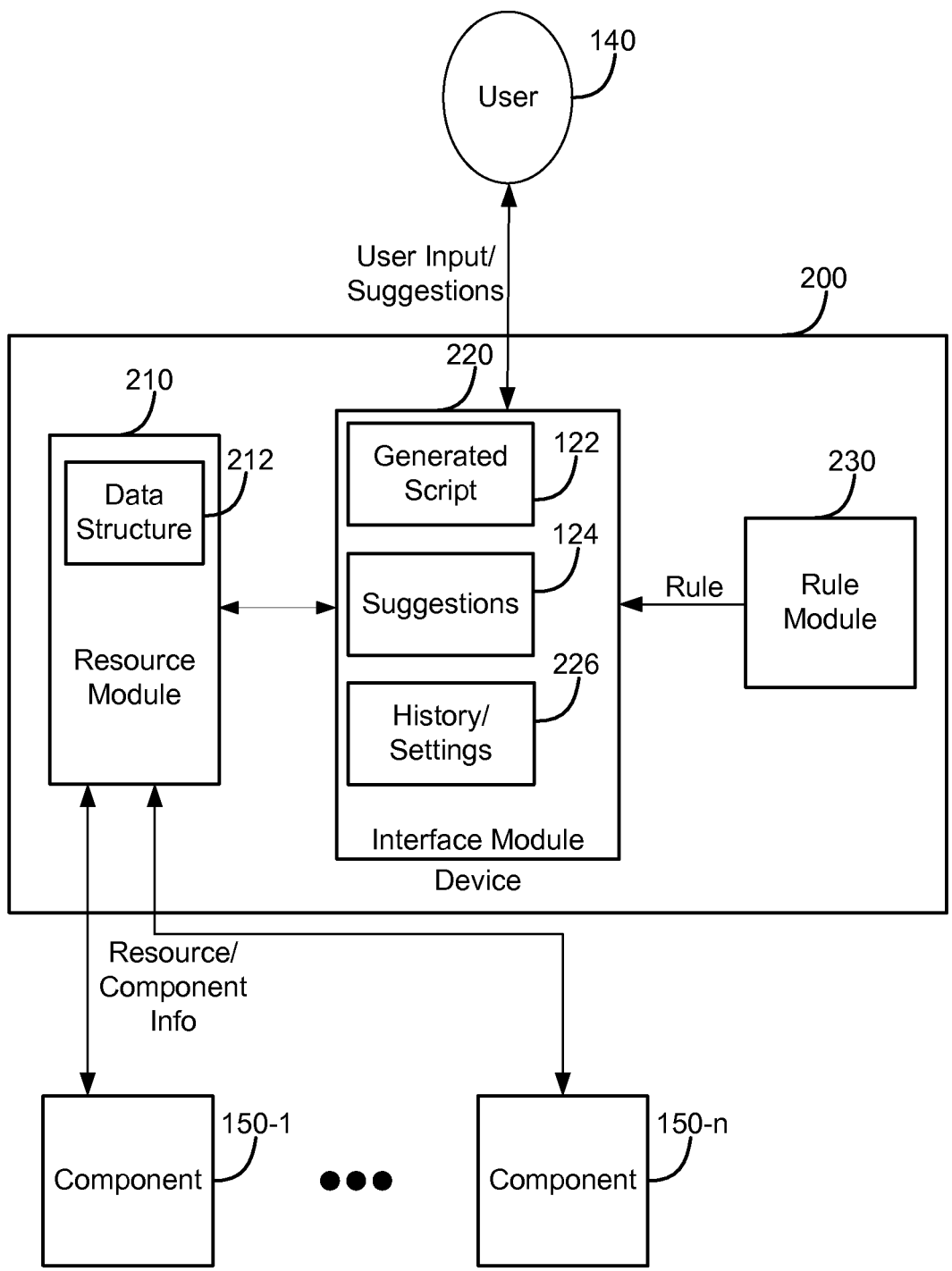
FIG. 2 is another example block diagram of a device for suggesting script modification.

FIG. 2 is another example block diagram of a device 200 for suggesting script modification. The device 200 may be included in any type of device to configure and/or control access to a resource of a component 150, such as a secure microprocessor, a notebook computer, a desktop computer, an all-in-one system, a slate computing device, a portable reading device, a wireless email device, a mobile phone, and the like. In the embodiment of FIG. 2, the device 200 includes a resource module 210, an interface module 220 and a rule module 230. The resource module 210 of FIG. 2 may at least include the functionality of the resource module 110 of FIG. 1 and the interface module 220 may at least include the functionality of the control module 120 of FIG. 1.

The rule module 230 may be any electronic, magnetic, optical, or other physical storage device that contains or stores information, such as a database. Thus, the rule module 230 may be, for example, Random Access Memory (RAM), an Electrically Erasable Programmable Read-Only Memory (EEPROM), a storage drive, a Compact Disc Read Only Memory (CD-ROM), and the like. The rule module 230 is to store the one or more rules, where the rules may be added, deleted and/or modified, such as by a user or administrator. The rules may be general to the entire system, such as allocating all resources equally between all consumers of resources, and/or specific, such as having different allocation schemes for different types of users, components, consumers, applications, etc. The interface module 220 is to receive the one or more rules from the rule module 230.

As noted above, the resource module 210 is to retrieve information about the components 150-1 to 150-n of the system, where n is a natural number. Further, the resource module 210 may create a data structure 212 using the retrieved information, such as a tree, to maintain a status of the one or more components 150-1 to 150-n providing the resources, such as the resource allocation of the components 150-1 to 150-n. Upon creating the data structure 212, the resource module 210 is to continuously monitor the resources and to update the data structure 212 if at least one of the components 150-1 to 150-n is added to the system, removed from the system and/or modified.

Further, the information retrieved by the resource module 210 may be used by the interface module 220 to determine a scripting syntax of the one or more components 150-1 to 150-n. In addition, the interface module 220 may also use the retrieved information to determine a status of the components 150-1 to 150-n, such as a type, amount and/or current assignment of the resources of the components 150-1 to 150-n. For example, the resource module 210 may notify the interface module 220 that a new component 150 has been added to system or that one of the components 150-1 to 150-n has been released and is now free to be allocated to another user, group, consumer, etc.

The resource module 210 may indicate any changes that occur in the data structure 212 or the interface module 220 may instead periodically poll the resource module 210 to determine changes in the data structure 212. As noted above, in addition to receiving the retrieved information from the resource module 210, the interface module 220 may also receive one or more of the rules from the rule module 230.

The interface module 220 may generate the script 122 for any one of components 150-1 to 150-n based on the retrieved information thereof and/or the one or more rules, without any intervention from the user 140. For example, upon receiving at least part of the retrieved information for one of the components 150, the interface module 220 may begin to generate a script 122 by defining properties of the resource of the component 150, such as by creating a zone indicating access parameters or usage permissions for the resource of the component 150. Next, the interface module 220 may continue generating the script 122 by assigning the resource, such as by adding one or more consumers of resources to the zone of the component 150. The assigning of the resource may be based one or more of the rules of the rule module 230 and/or other factors, such as properties the component 150, predetermined settings and/or a history of actions 226 for a similar component and/or user.

The above operations may be carried out before the user 140 has even initially accessed the one or more components 150-1 to 150-n. Upon accessing the one or more components 150-1 to 150-n, the user 140 may automatically be provided with the script 122 by the interface module 220. For example, the user 140 may seek to seek to configure a new component 150 added to the system and discovered by the resource module 210. Thus, the user 140 may access, for example, a graphical user interface (GUI) and/or command line interface (CLI) via the interface module 220 and the interface module 220 may automatically provide the user 140 with the generated script 122 that provides an initial allocation of the resource of the component 150. The script 122 may be further edited by the user 140 and/or the interface module 220. For example, the interface module 220 may suggest a change to the script 122 based on change in a setting or status of the component 150 and/or a history of prior input 226 by the user 140.

In one embodiment, the resource module 210 may parse the generated script 122 and the data structure 212. Then, the resource module 210 may provide a suggestion to the interface module 220 based on differences between the generated script 122 and the data structure 212. For example, the resource module 210 may suggest to the interface module 220 to modify the generated script 122 if the resource module 210 finds a resource in the data structure 212 not accounted for in the generated script 122.

Alternatively or in addition, the interface module 220 may continuously monitor the resources available, as indicated by the resource module 210, and provide the suggestion 124 to edit to script 122 based on a change in the available resources, such as change in the data structure 212. Further, the interface module 220 may notify the rules module 230 and/or the resource module 210 if the user 140 modifies the script 122, where the modification relates a change in the allocation of at least one of the resources. For example, if the user 140 removes an assignment of one of the components 150 from a group, the interface module 220 may indicate to the resource module 210 that the corresponding resource is now unallocated.

Further, as the user 140 manually edits the script 122, the interface module 220 may provide the suggestion 124 to the user 140 in real time. For example, the suggestion 124 may relate to at least one of indicating if a value of a parameter entered by the user 140 in the script 122 is out of a range of the component 150 and/or providing a range of values for the parameter selected by the user 140 in the script 122. Example ways of providing the suggestion may include adding the suggestion124 to the script 122 without prompting the user 140, such as by automatically populating a field of the parameter, or prompting the user 140 before adding the suggestion 124 to the script 122.

If the suggestion 124 is added to script 122 without prompting the user 140, the suggestion 124 may still be removed from the script 122 by the user 140, such as by deleting or undoing the suggestion 124 from the script 122. Example ways of prompting the user 140 may include allowing the user 140 to cycle through possible options for the parameter and/or values of the parameters as the user 140 begins to enter the type of the parameter and/or the value of the parameter.

Figure 3:
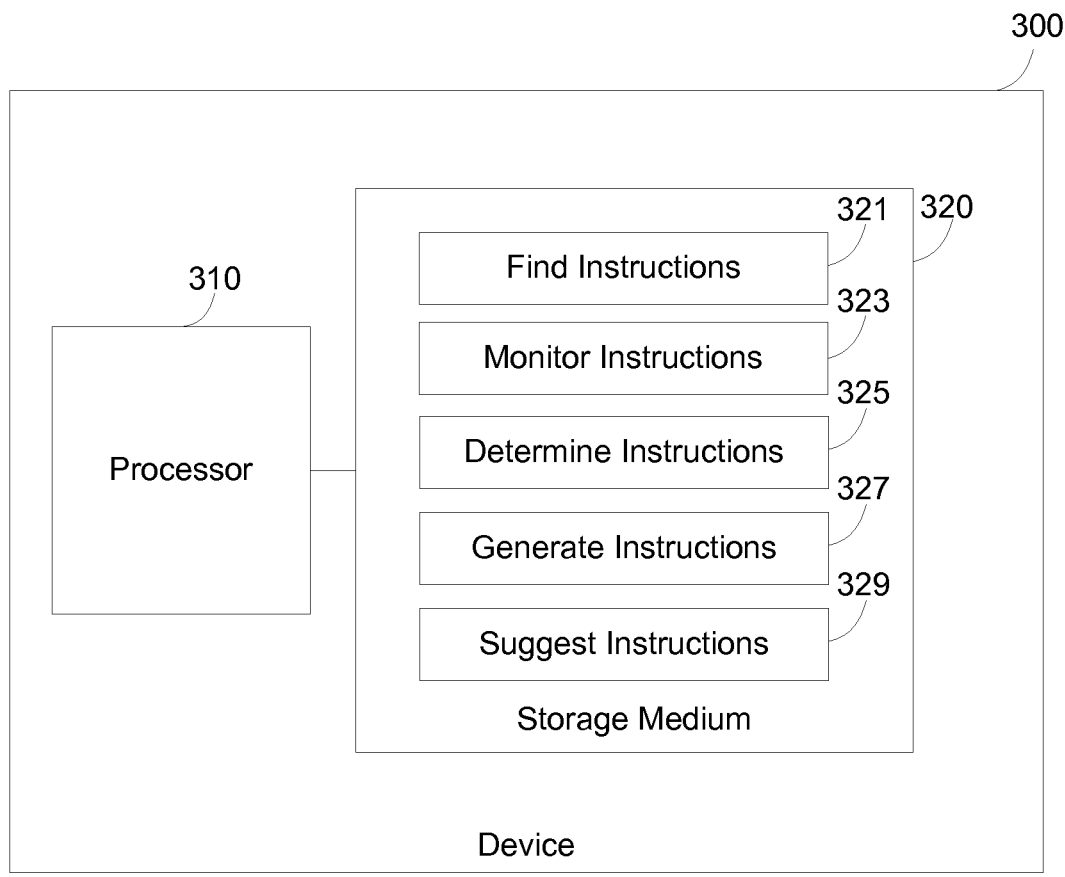
FIG. 3 is an example block diagram of a computing device including instructions for suggesting script modification.

FIG. 3 is an example block diagram of a computing device 300 including instructions for suggesting script modification. In the embodiment of FIG. 3, the computing device 300 includes a processor 310 and a machine-readable storage medium 320. The machine-readable storage medium 320 further includes instructions 321, 323, 325, 327 and 329 for suggesting script modification.

The computing device 300 may be, for example, a chip set, a notebook computer, a desktop computer, a slate computing device, a portable reading device, a wireless email device, a mobile phone, or any other type of user device capable of executing the instructions 321, 323, 325, 327 and 329. In certain examples, the computing device 300 may include or be connected to additional components such as memories, sensors, displays, etc.

The processor 310 may be, at least one central processing unit (CPU), at least one semiconductor-based microprocessor, at least one graphics processing unit (GPU), other hardware devices suitable for retrieval and execution of instructions stored in the machine-readable storage medium 320, or combinations thereof. The processor 310 may fetch, decode, and execute instructions 321, 323, 325, 327 and 329 for suggesting script modification. As an alternative or in addition to retrieving and executing instructions, the processor 310 may include at least one integrated circuit (IC), other control logic, other electronic circuits, or combinations thereof that include a number of electronic components for performing the functionality of instructions 321, 323, 325, 327 and 329.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for suggesting script modification.

Moreover, the instructions 321, 323, 325, 327 and 329 when executed by a processor (e.g., via one processing element or multiple processing elements of the processor) can cause the processor to perform processes, such as, the process of FIG. 4. For example, the find instructions 321 may be executed by the processor 310 to find a component (not shown) of a system (not shown). The monitor instructions 323 may be executed by the processor 310 to monitor a resource provided by the component. The determine instructions 325 may be executed by the processor 310 to determine a syntax to configure the component.

The generate instructions 327 may be executed by the processor 310 to generate a script (not shown) to allocate the resource of the component based on a status of the monitored resource, the determined syntax, and a rule related to resource allocation. The suggest instructions 329 may be executed by the processor 310 to suggest modifying the script based on at least one of a change in the status of the monitored resource, the rule, and the script by a user. The suggestion based on the change in the script by the user may relate to at least one of indicating if a value of a parameter entered by the user is out a range of the component and providing a range of values for the parameter entered by the user.

FIG. 4 is an example flowchart of a method 400 for suggesting script modification. Although execution of the method 400 is described below with reference to the device 100, other suitable components for execution of the method 400 can be utilized, such as the device 200. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 405, the device 100 discovers and monitors a resource of a system, the resource provided by a component 150 of the system. Next, at block 410, the device 100 reads a rule related to management of the resource. The rule may relate to at least one of an efficient and equal distribution of any unallocated resources. Then, at block 415, the device 100 generates a script 122 to configure the component 150 based on the rule and without input from a user 140. The script 122 may be editable by the user 140. Lastly, the device 100 continuously provides suggestions to the user 140 to modify the script 122 based on at least one of a change in the resource, the rule, and the script 122 by the user. The suggestion may be based on a setting of the component 150 and/or a history of prior input by the user 140.

According to the foregoing, embodiments provide a method and/or device for generating configuration scripts without user intervention and automatically providing suggestions for editing the configuration scripts. For example, embodiments may discover a component and/or its resource in the system. A script for configuring the component may be automatically generated based on a rule related to resource allocation. A suggestion to modify the script may be provided in real time based on a change in the rule, the resource, and/or the script by a user.

Specific details are given in the above description to provide an understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

We claim:

1. A device comprising:
   a processor; and
   a machine-readable storage medium coupled to the processor, the machine readable storage medium having instructions stored thereon which, when executed by the processor cause the device to perform operations comprising:
   discover a resource in a system, where a component of the system is to provide the resource; and
   generate a script for configuring the component providing the resource based on a rule, wherein
   a suggestion is provided to modify the script based on at least one of a change in the rule, the resource, and the script by a user.

2. The device of claim 1, wherein
   the rule relates to at least one of distributing one or more of the resources evenly between one or more consumers of resources, maximizing a use of the one or more resources, and allocating any of the more resources that are not being used.

3. The device of claim 1, wherein,
   the generated script is presented to the user as an initial allocation of the resource of the component, and
   the generated script is editable by the user.

4. The device of claim 3, wherein,
   a scripting syntax of the component is determined and the script is generated without user intervention, and
   the suggestion is based on at least one of a setting of the component and a history of prior input by the user.

5. The device of claim 4, wherein the suggestion relates to at least one of indicating if a value of a parameter entered by the user is out of a range of the component and providing a range of values for the parameter selected by the user.

6. The device of claim 4, wherein,
   the suggestion is at least one of added to the script without prompting the user and added to the script after prompting the user, and
   the suggestion is removable by the user if the suggestion is added to script without prompting the user.

7. The device of claim 1, wherein,
   a data structure is created to maintain a status of the one or more components providing the resources, and
   the resources are continuously monitored and the data structure is updated if at least one of the components is at least one of added to the system, removed from the system, and modified.

8. The device of claim 7, wherein,
   the generated script and the data structure are parsed, and
   the generated script is suggested to be modified if a resource in the data structure is found that is not accounted for in the generated script.

9. The device of claim 7, wherein,
   a poll is executed to determine available resources, and
   a suggestion to change the script is provided to the user based on the available resources.

10. The device of claim 7, wherein
    notification occurs if the user modifies the script, the modification relating a change in the allocation of at least one of the resources.

11. The device of claim 1, wherein,
    the system is a network and the component is at least one of a storage device, a switch, enclosure, server, and controller,
    the user is to communicate via at least one of a graphical user interface (GUI) and a command line interface (CLI), and
    zones are created and each of the resources are assigned to one of zones, the user being to one of the zones.

12. A method, comprising:
    discovering and monitoring a resource of a system, using a processor, the resource provided by a component of the system;
    reading, using the processor, a rule related to management of the resource;
    generating, using the processor, a script to configure the component based on the rule and without input from a user, the script to be editable by the user; and
    providing suggestions, using the processor, to the user to modify the script based on at least one of a change in the resource, the rule, and the script by the user.

13. The method of claim 12, wherein,
    the suggestion is based on at least one of a setting of the component and a history of prior input by the user, and
    the rule relates to at least one of an efficient and equal distribution of any unallocated resources.

14. A non-transitory computer-readable storage medium storing instructions that, if executed by a processor of a device, cause the processor to:
    find a component of a system;
    monitor a resource provided by the component;
    determine a syntax to configure the component;
    generate a script to allocate the resource of the component based on a status of the monitored resource, the determined syntax, and a rule related to resource allocation; and
    suggest modifying the script based on at least one of a change in the status of the monitored resource, the rule, and the script by a user.

15. The non-transitory computer-readable storage medium of claim 14, wherein the suggestion based on the change in the script by the user relates to at least one of indicating if a value of a parameter entered by the user is out a range of the component and providing a range of values for the parameter entered by the user.

* * * * *

UNITED STATES PATENT AND TRADEMARK OFFICE
CERTIFICATE OF CORRECTION

| | |
|---|---|
| PATENT NO. | : 8,959,191 B2 |
| APPLICATION NO. | : 13/441349 |
| DATED | : February 17, 2015 |
| INVENTOR(S) | : Michael G. Myrah et al. |

It is certified that error appears in the above-identified patent and that said Letters Patent is hereby corrected as shown below:

In the Claims

In column 8, line 17, in Claim 11, delete "to" and insert -- assigned to --, therefor.

Signed and Sealed this
Seventh Day of July, 2015

Michelle K. Lee
*Director of the United States Patent and Trademark Office*